US011011958B2

(12) United States Patent
Croce, Jr.

(10) Patent No.: US 11,011,958 B2
(45) Date of Patent: May 18, 2021

(54) EXTREME ENVIRONMENT VARIABLE RELUCTANCE ENERGY HARVESTER AND METHOD FOR IMPLEMENTING SAME

(71) Applicant: HARCO, LLC, Branford, CT (US)

(72) Inventor: Robert A. Croce, Jr., Branford, CT (US)

(73) Assignee: HARCO SEMCO, LLC, Branford, CT (US)

( * ) Notice: Subject to any disclaimer, the term of this patent is extended or adjusted under 35 U.S.C. 154(b) by 0 days.

(21) Appl. No.: 15/795,996

(22) Filed: Oct. 27, 2017

(65) Prior Publication Data

US 2018/0123423 A1 May 3, 2018

Related U.S. Application Data

(60) Provisional application No. 62/413,584, filed on Oct. 27, 2016.

(51) Int. Cl.
*H02K 7/02* (2006.01)
*H02K 7/18* (2006.01)
*H02K 35/06* (2006.01)
*H02K 1/02* (2006.01)
*H02K 47/02* (2006.01)
*H02K 49/10* (2006.01)
*F03G 7/08* (2006.01)

(52) U.S. Cl.
CPC ............... *H02K 7/025* (2013.01); *H02K 1/02* (2013.01); *H02K 7/1846* (2013.01); *H02K 35/06* (2013.01); *H02K 47/02* (2013.01); *H02K 49/102* (2013.01); *F03G 7/08* (2013.01)

(58) Field of Classification Search
CPC ...... H02K 7/025; H02K 7/1846; H02K 35/06; H02K 1/02; H02K 47/02; H02K 49/102; F03G 7/08
USPC ............................ 310/34, 153, 181, 216.091
See application file for complete search history.

(56) References Cited

U.S. PATENT DOCUMENTS

| | | | | |
|---|---|---|---|---|
| 3,081,412 A | * | 3/1963 | Granier | H02K 1/165 310/179 |
| 3,458,765 A | * | 7/1969 | Schindler | H02K 39/00 361/259 |
| 3,722,488 A | * | 3/1973 | Swift | F02P 1/086 123/406.57 |
| 3,760,313 A | * | 9/1973 | Schindler | H02K 35/06 335/229 |
| 3,941,111 A | * | 3/1976 | Carmichael | F02P 1/086 123/406.57 |
| 4,056,088 A | * | 11/1977 | Carmichael | F02P 1/086 123/600 |

(Continued)

*Primary Examiner* — John K Kim
(74) *Attorney, Agent, or Firm* — Steven M. McHugh

(57) ABSTRACT

An energy harvester article configured to associate with a ferromagnetic flywheel having gear teeth is provided and includes a magnet, a first pole piece, wherein the first pole piece includes a first pole piece first end and a first pole piece second end, a second pole piece, wherein the second pole piece includes a first portion and a second portion configured into an "L" shape, and wherein the second portion is arranged to be substantially parallel with the first pole piece and separated from the first pole piece by a distance L, and a coil, wherein the coil is configured to be wrapped around the first pole piece proximate the first pole piece second end.

20 Claims, 13 Drawing Sheets

(56) References Cited

U.S. PATENT DOCUMENTS

| | | | | |
|---|---|---|---|---|
| 4,074,669 | A * | 2/1978 | Cavil | F02P 1/086 123/599 |
| 6,246,561 | B1 * | 6/2001 | Flynn | H02K 1/12 361/147 |
| 8,860,239 | B2 * | 10/2014 | Hein | H02K 21/44 290/55 |
| 2002/0078937 | A1 * | 6/2002 | Kiessling | G01P 13/045 123/603 |
| 2005/0223541 | A1 * | 10/2005 | Ionel | H02K 21/18 29/596 |
| 2010/0259112 | A1 * | 10/2010 | Chung | H02K 16/00 310/12.18 |
| 2012/0175884 | A1 * | 7/2012 | Hein | H02K 21/44 290/55 |
| 2018/0123423 | A1 * | 5/2018 | Croce, Jr. | H02K 7/1846 |

* cited by examiner

US 11,011,958 B2

EXTREME ENVIRONMENT VARIABLE RELUCTANCE ENERGY HARVESTER AND METHOD FOR IMPLEMENTING SAME

This application is related to and claims the benefit of the filing date of U.S. Provisional Patent Application Ser. No. 62/413,584 filed Oct. 27, 2016, the contents of which are incorporated herein by reference in its entirety.

FIELD OF THE INVENTION

The present invention relates generally to variable reluctance energy harvesters, and more particularly to variable reluctance energy harvesters which uses its intrinsic alternating current output as a local power source.

BACKGROUND OF THE INVENTION

Extreme environments consisting of large thermal gradients, altitude variations, and constant mechanical shock and vibrations pose a challenge to employing conventional localized power sources, such as batteries, which yield a limited lifetime and decreased performance when operating under the extreme environmental stressors. In these environments, typical energy harvesting approaches (including but not limited to vibration, thermal, radio frequency, etc.) are insufficient to provide continuous power to the majority of aircraft electrical systems, and therefore must attempt to operate under synchronized power-up and sleep transmission periods (in order to charge an external storage capacitor) as determined by a centralized master controller, timer or passive RF excitation time cycle. This is undesirable because for some aircraft engine measurement and control sensors, the fastest power-up/sleep transmission time periods determined by the amount of harvested energy may not meet the mandatory sensor data rates to the full authority digital engine control (FADEC) or a similar engine control unit (ECU).

SUMMARY OF THE INVENTION

An energy harvester article configured to associate with a ferromagnetic flywheel having gear teeth is provided and includes a magnet, a first pole piece, wherein the first pole piece includes a first pole piece first end and a first pole piece second end. The energy harvester article further includes a second pole piece, wherein the second pole piece includes a second pole piece first portion and a second pole piece second portion, and wherein the second pole piece first portion includes a second pole piece first portion first end and a second pole piece first portion second end, and wherein the second pole piece second portion includes a second pole piece second portion first end and a second pole piece second portion second end, and wherein the second pole piece first portion is configure to be substantially perpendicular to the first pole piece and the second pole piece first portion first end is located proximate the first pole piece first end, and wherein the second pole piece second portion is configure to be substantially parallel to the first pole piece and the second pole piece second portion first end is located proximate the second pole piece first portion second end, and wherein the first pole piece and second pole piece second portion are separated by a predetermined distance. Moreover, the energy harvester article includes a coil, wherein the coil is configured to be wrapped around the first pole piece proximate the first pole piece second end.

An energy harvester article configured to associate with a ferromagnetic flywheel having gear teeth is provided and includes a magnet, a first pole piece, wherein the first pole piece includes a first pole piece first end and a first pole piece second end, a second pole piece, wherein the second pole piece includes a first portion and a second portion configured into an "L" shape, and wherein the second portion is arranged to be substantially parallel with the first pole piece and separated from the first pole piece by a distance L, and a coil, wherein the coil is configured to be wrapped around the first pole piece proximate the first pole piece second end

BRIEF DESCRIPTION OF THE DRAWINGS

The foregoing and other features and advantages of the present invention should be more fully understood from the accompanying detailed description of illustrative embodiments taken in conjunction with the following Figures in which like elements are numbered alike in the several Figures.

DETAILED DESCRIPTION

In accordance with the present invention, an efficient energy harvesting system and method for harvesting and providing electrical power for electronic devices operating in the extreme environment of an aircraft, such as those present on aircraft gas turbine engines on turbo-fan, turbo-shaft, turbo-jet and/or jet aircraft is provided. It should be appreciated that the present invention utilizes a variable reluctance speed sensor (also called a VR sensor) which, simply put, detects the presence or proximity of a ferrous object. These VR sensors are typically used on aircraft engines to detect the angular position and/or velocity of a rotating toothed wheel which is constructed from a ferrous material. For example, in one embodiment one VR sensor may be used to measure the fan speed in the front of a jet engine (i.e. N1, low pressure compressor), while another one VR sensor may be used to measure the fan speed within the center portion of the jet engine (i.e. N2, high pressure compressor). Other VR sensors may be used to measure additional parameters as desired.

Figure 1A:
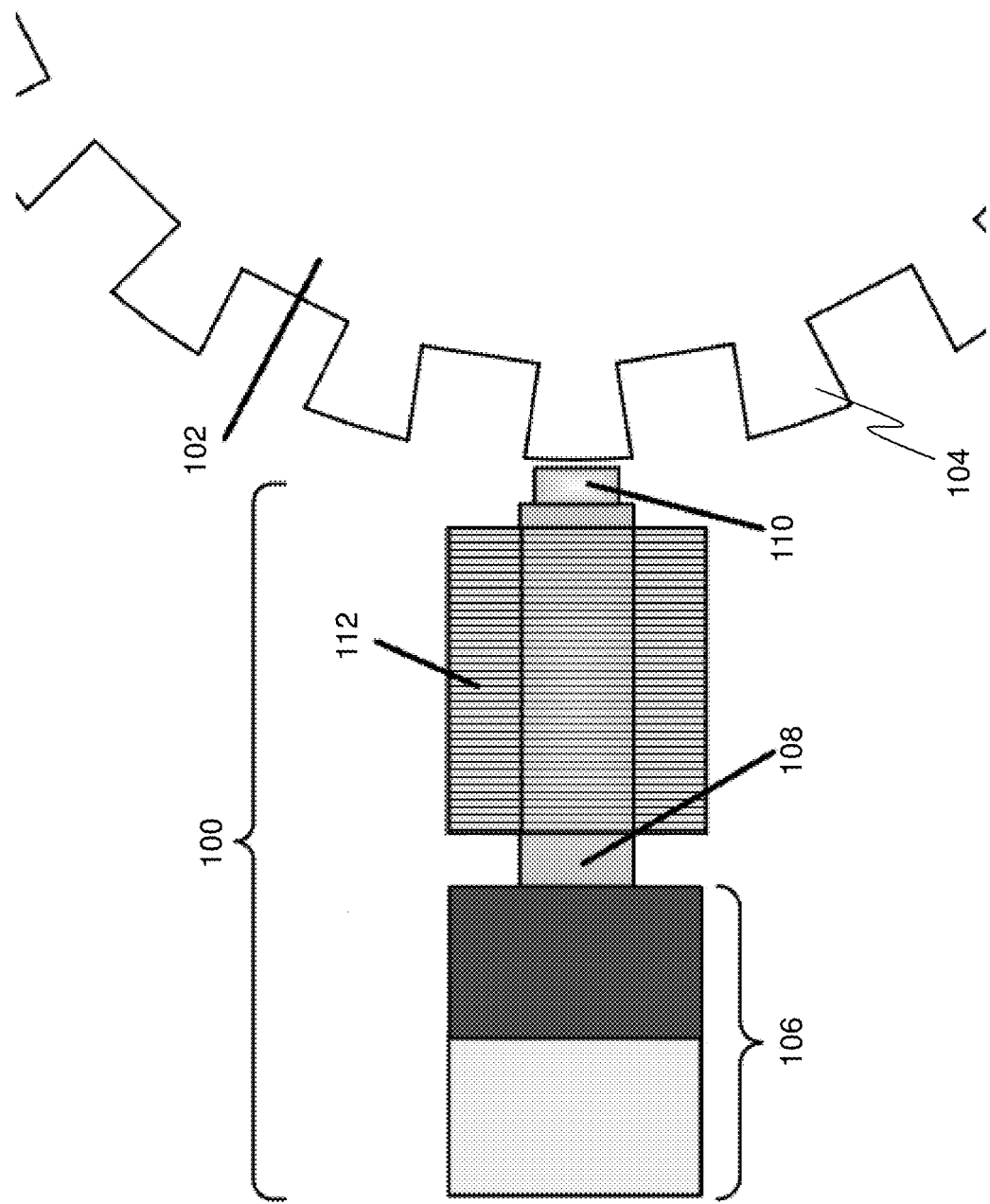
FIG. 1A shows a variable reluctance speed sensor, in accordance with the prior art.

Referring to FIG. 1A, a reluctance VR Sensor 100 in accordance with the prior art is shown and includes a ferrous flywheel 102 having one or more gear teeth 104, a magnet 106, a pole piece 108 having a mechanical step 110 and a coil 112. The ferrous flywheel 102 is typically associated with a moving part in an engine and rotates at a velocity responsive to the velocity of the moving part. Additionally, the pole piece 108 and the gear teeth 104 are configured such that when the ferrous flywheel 102 rotates each of the gear teeth 104 passes proximate to the pole piece 108. As the gear teeth 104 rotate pass the pole piece 108, the amount of magnetic flux coupled into the coil varies. The magnetic flux is concentrated through the pole piece when each of the gear teeth 104 is close to the pole piece 108, and when the gear teeth 104 move away, the magnetic flux expands outward. This creates a time-varying magnetic flux that induces a proportional voltage in the coil 112. This time-varying magnetic flux is then processed into a digital signal that provides information about the velocity of the flywheel 102.

The present invention advantageously harvests energy from this time-varying magnetic flux and uses it to power electronics located on the aircraft. Moreover, it should be appreciated that this invention may be used in any aerospace and/or non-aerospace applications which involve variable reluctance technology suitable to the desired end purpose. Additionally, this invention may be applied to any other device(s) on the aircraft which is capable of measuring the presence of a ferromagnetic structure which produces a time varying waveform. In accordance with one embodiment of the invention, the intrinsic alternating current nature of the device's output can be used as a local power generator for powering electronic circuitry, sensors, transceivers, solenoids, wireless sensor networks/circuits, and/or any other on-engine system which requires the need for a constant localized power source.

It should be appreciated that in one embodiment, the harvested power can be delivered to components as alternating current, or in another embodiment, the harvester may include (or be associated with) alternating current (AC) to direct current (DC) conversion electronics, and supply the end component or system with DC power and/or a combination of both AC and DC power. One point of novelty of this invention includes the ability to provide usable amounts of electrical power on multiple independent channels from the same device by outfitting the energy harvester with multiple coils which can be used to simultaneously power a variety of electronic devices. This invention also discloses methods to optimize the harvester's output impedance to deliver the maximum amount of current to a load for a given sensor size constraint. Moreover, it should be appreciated that in at least one embodiment, the invention disclosed herein may be outfitted with RF telemetry and corresponding signal processing electronics and may be configured as a self-powered wireless speed sensor for N1/N2 measurements as previously mentioned, or similarly harsh environment transient parameters. Moreover, as stated above it may behave simultaneously as an energy harvester as well as variable reluctance speed sensor.

Figure 1B:
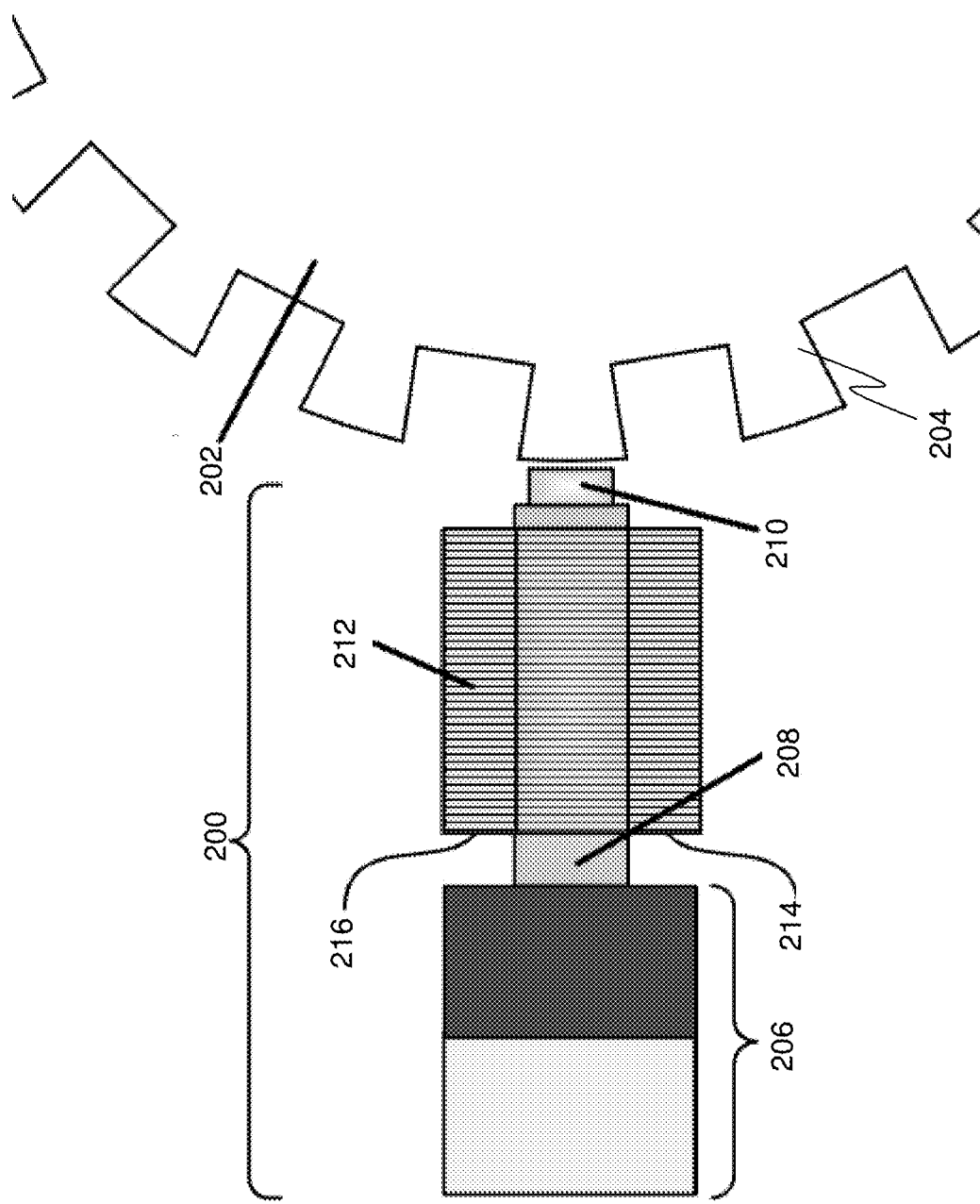
FIG. 1B shows schematic block diagram illustrating an energy harvester, in accordance with first embodiment of the invention.

In accordance with one embodiment of the invention and referring to FIG. 1B, one embodiment of an energy harvester 200 is shown and includes a ferromagnetic flywheel 202 having gear teeth 204, a magnet 206, a pole piece 208 having a mechanical step 210, a coil 212, a first AC output lead (AC1) 214 and a second AC output lead (AC2) 216. It should be appreciated that in other embodiments any type of ferromagnetic material and/or device which provides a time-variant waveform having a first AC output and a second AC output may be used suitable to the desired end purpose. It should be appreciated that the magnet 206 polarity orientation (north/south) is facing the pole piece 208 and is of arbitrary direction and this arbitrary polarity orientation may hold true for other embodiments containing magnets. It is contemplated that the magnet 206 may be constructed of a material that is appropriately chosen such that its magnetic performance is preserved at the elevated temperatures present in the area around an aircraft engine. Some examples of these appropriate high temperature magnetic materials may include, but are not limited to, variants of samarium cobalt (SmCo), such as SmCo series 1:5 and series 2:17. Moreover, the coil 212 may include a magnetic wire insulated with a polyimide or other high-temperature electric insulator material. In one embodiment, the mechanical step 210 at the tip of the pole piece 208 may be used in the final assembly of the energy harvester 200 and may help in aligning the magnet 206, pole piece 208 and coil(s) 212 components flush against the end of the mechanical housing of the energy harvester 200.

In the specific case of aircraft engine applications, the variable reluctance energy harvester structure shown herein may measure the rotational tangential velocity of the ferromagnetic flywheel 202 (or other ferromagnetic material) which is quantitatively related to the engine speed, whether it be N1, N2 or a once-per-revolution configuration. It should be appreciated that the generated electrical signals from the first AC output lead (AC1) 214 and the second AC output lead (AC2) 216 during the energy harvesting operation may be supplied to electronic components in an intrinsic AC form and converted to usable DC power, or the generated electrical signals may be AC/DC converted locally at the coil 212 output to supply the end electrical components with DC rectified power.

Figure 2:
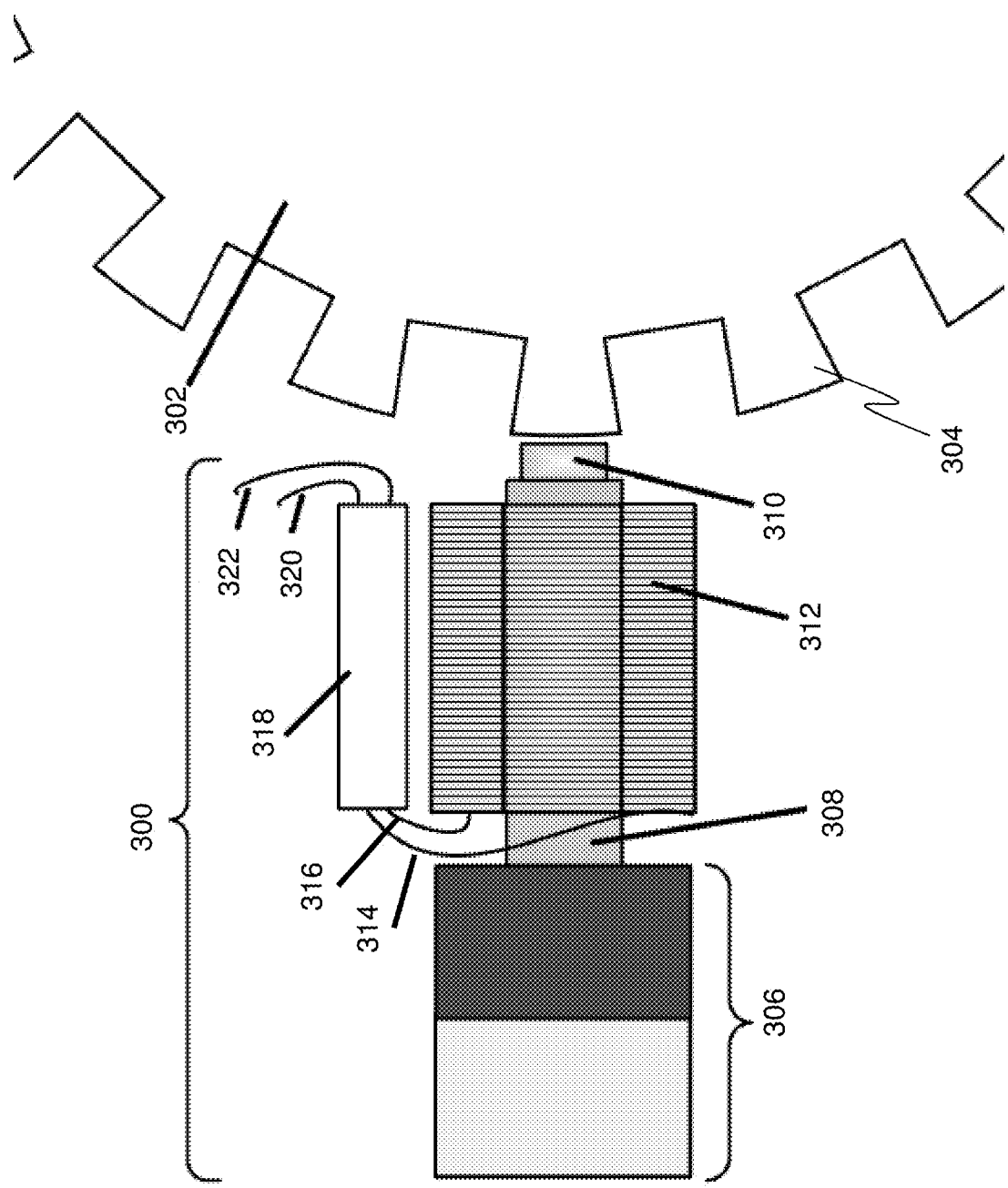
FIG. 2 shows schematic block diagram illustrating an energy harvester, in accordance with a second embodiment of the invention.

Referring to FIG. 2, an energy harvester 300 is shown in accordance with another embodiment and is associated with a ferromagnetic flywheel 302 having gear teeth 304, wherein the energy harvester 300 includes a magnet 306, a pole piece 308 having a mechanical step 310, a coil 312, a first AC output lead (AC1) 314 and a second AC output lead (AC2) 316. It should be appreciated that the magnet 306 polarity orientation (north/south) is facing the pole piece 308 and is of arbitrary direction and this arbitrary polarity orientation may hold true for other embodiments containing magnets. It is contemplated that the magnet 306 may be constructed of a material that is appropriately chosen such that its magnetic performance is preserved at the elevated temperatures present in the area around an aircraft engine. Some examples of these appropriate high temperature magnetic materials may include, but are not limited to, variants of samarium cobalt (SmCo), such as SmCo series 1:5 and series 2:17. Moreover, the coil 312 may include a magnetic wire insulated with a polyimide or other high-temperature electric insulator material. It should be appreciated that although the energy harvester 300 is discussed herein as including ferromagnetic flywheel 302, the ferromagnetic flywheel 302 is actually separate from the energy harvester 300.

Additionally, the energy harvester 300 may include an AC/DC converter 318 having a positive DC voltage ($V_{DC+}$) output lead 320 and a negative DC voltage ($V_{DC-}$) output lead 322. It should appreciated that the AC/DC converter 318 is configured to convert the output from the first AC output lead (AC1) 314 and the second AC output lead (AC2) 316 into a positive DC voltage at positive DC voltage ($V_{DC+}$) output lead 320 and a negative DC voltage at negative DC voltage ($V_{DC-}$) output lead 322, respectively. It is contemplated that the AC/DC converter 318 and/or DC conversion components can either be integrated within the mechanical housing of the energy harvester 300, and/or added as a stand-alone unit connected to the output of the energy harvester 300. Moreover, depending upon the application, rectification schemes can be designed for high-temperature operation by using temperature compensation design techniques in bulk silicon, silicon-on-insulator (SOI) and/or silicon carbide (SiC) device fabrication technology if the local operating temperature of the energy harvester 300 exceeds the upper military temperature range of about 125° C. It should be appreciated that, for these operating temperatures, high temperature materials and packaging methodologies may be employed for electronics integration and energy harvester mechanical assembly.

Figure 3:
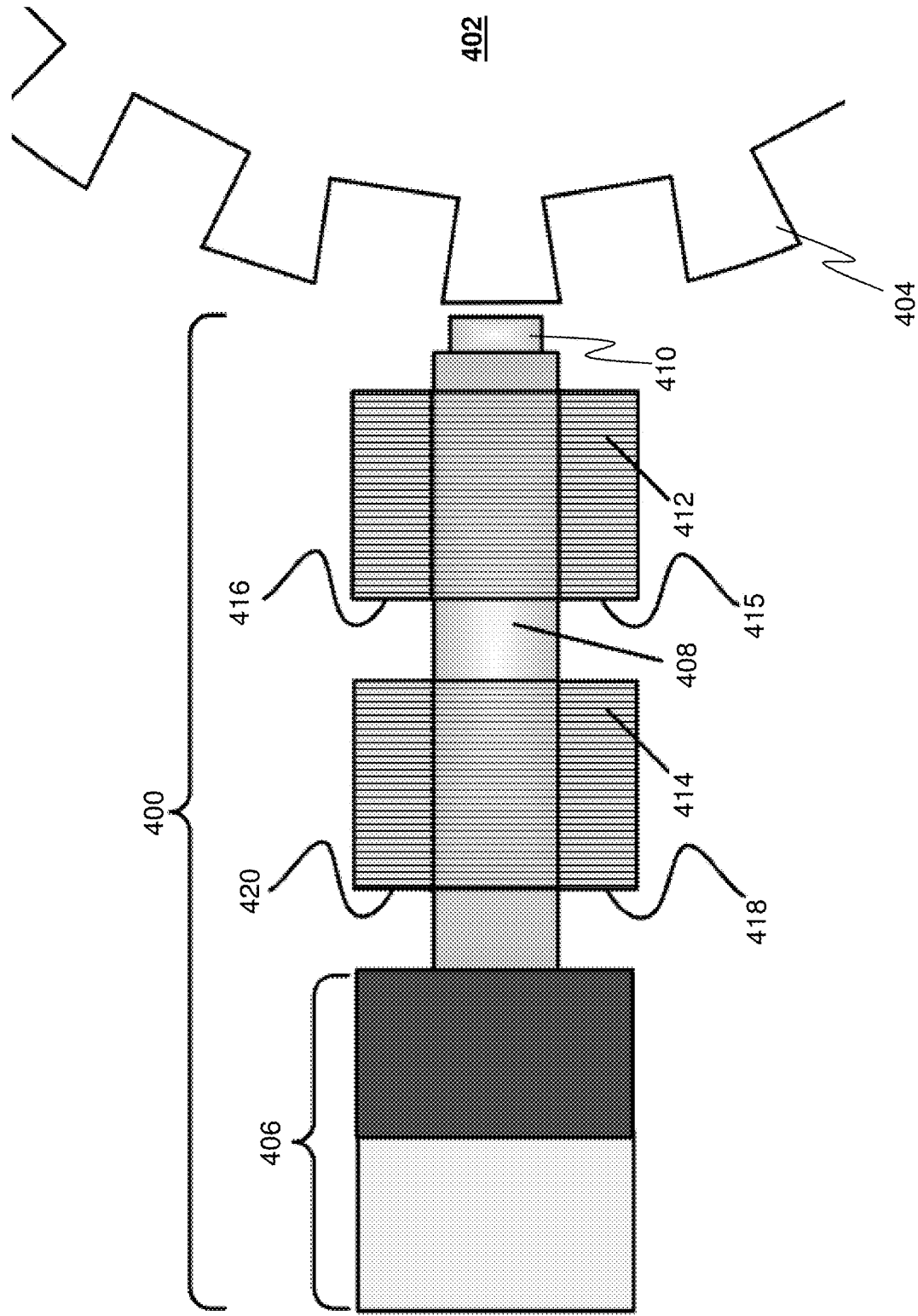
FIG. 3 shows schematic block diagram illustrating an energy harvester, in accordance with a third embodiment of the invention.

Referring to FIG. 3 still yet another embodiment of an energy harvester 400 is shown associated with a ferromagnetic flywheel 402 having gear teeth 404 and includes a magnet 406, a pole piece 408 having a mechanical step 410, a first coil 412, a second coil 414, a first coil first AC output lead (FCAC1) 415, first coil second AC output lead (FCAC2) 416, a second coil first AC output lead (SCAC1) 418 and a second coil second AC output lead (SCAC2) 420. It should be appreciated that the magnet 406 polarity orientation (north/south) is facing the pole piece 408 and is of arbitrary direction and this arbitrary polarity orientation may hold true for other embodiments containing magnets. It is contemplated that the magnet 406 may be constructed of a material that is appropriately chosen such that its magnetic performance is preserved at the elevated temperatures present in the area around an aircraft engine. Again, some examples of these appropriate high temperature magnetic materials may include, but are not limited to, variants of samarium cobalt (SmCo), such as SmCo series 1:5 and series 2:17. It should be appreciated that the first coil 412 and the second coil 414 may be independent coils that are wrapped around the pole piece 408, wherein the first coil 412 is locate proximate the magnet 406 and the second coil 414 is located proximate the mechanical step 410.

This advantageously provides two (2) independent power channels, wherein the first independent power channel includes the second coil first AC output lead (SCAC1) 418 and the second coil second AC output lead (SCAC2) 420 and wherein the second independent power channel includes the first coil first AC output lead (FCAC1) 415 and the first coil second AC output lead (FCAC2) 416. Accordingly, the first and second independent power channels allow the energy harvester 400 to simultaneously power two (2) electrical devices. Moreover, since both the first coil 412 and the second coil 414 are wrapped around the same pole piece 408, both the first and second coil 412, 414 will see a magnetic flux change with respect to the same rotational time period of the ferromagnetic gear tooth 404 and/or other ferromagnetic structure or assembly. Additionally, it is noteworthy to mention that similar to FIG. 2, this design can be outfitted with one or more AC/DC converters 318 (and/or conversion electronics) that are designed to operate reliably at elevated operating temperatures, thereby supplying two (or more) DC power signals to local devices/systems. It should also be appreciated that the remaining variable reluctance sensor topologies presented throughout the body of this invention can be outfitted with local AC to DC conversion electronics if so desired. Moreover, it is contemplated that devices (and/or circuitry) can be configured (or added) to deliver different DC voltages. It should be appreciated that, if the coil could generate enough power, multiple devices could be connected to the same coil.

Figure 4:
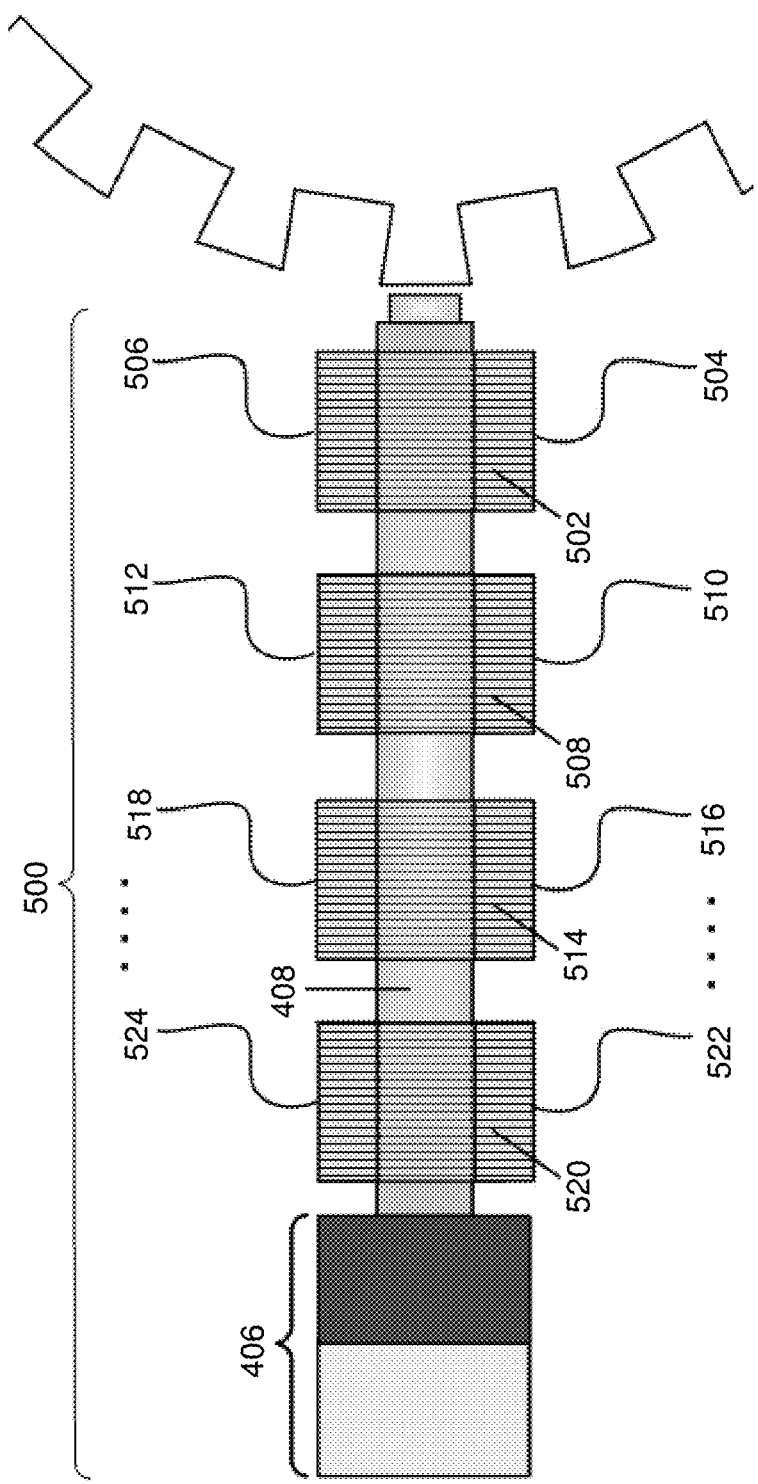
FIG. 4 shows schematic block diagram illustrating an energy harvester, in accordance with a fourth embodiment of the invention.

Referring to FIG. 4, still yet another embodiment of an energy harvester 500 is shown and may include multiple coils wrapped around the pole piece 408. It should be appreciated that the energy harvester 400 of the previous embodiment may be extended to include a multiplicity of N back-to-back coils. For example, as shown in FIG. 4, the energy harvester 500 includes a first coil 502 having a first coil first AC output lead (FCFAC1) 504 and a first coil second AC output lead (FCSAC2) 506, a second coil 508 having a second coil first AC output lead (SCFAC1) 510 and a second coil second AC output lead (SCSAC2) 512, a third coil 514 having a third coil first AC output lead (TCFAC1) 516 and a third coil second AC output lead (TCSAC2) 518 to an N coil 520 having an N coil first AC output lead (NCFAC1) 522 and a N coil second AC output lead (NCSAC2) 524 each of which are wrapped around pole piece 408 associated with magnet 406 thereby providing N independent power distribution channels intended to power N independent electrical devices/systems, such as wireless sensors, wireless nodes and/or wireless sensor gateways. Moreover, it is noteworthy to mention that similar to FIG. 2, this design can be outfitted with one or more AC/DC converters 318 (and/or conversion electronics) that are designed to operate reliably at elevated operating temperatures, thereby supplying two DC power signals to local devices/systems. It should also be appreciated that the remaining variable reluctance sensor topologies presented throughout the body of this invention can be outfitted with local AC to DC conversion electronics if so desired.

Figure 5:
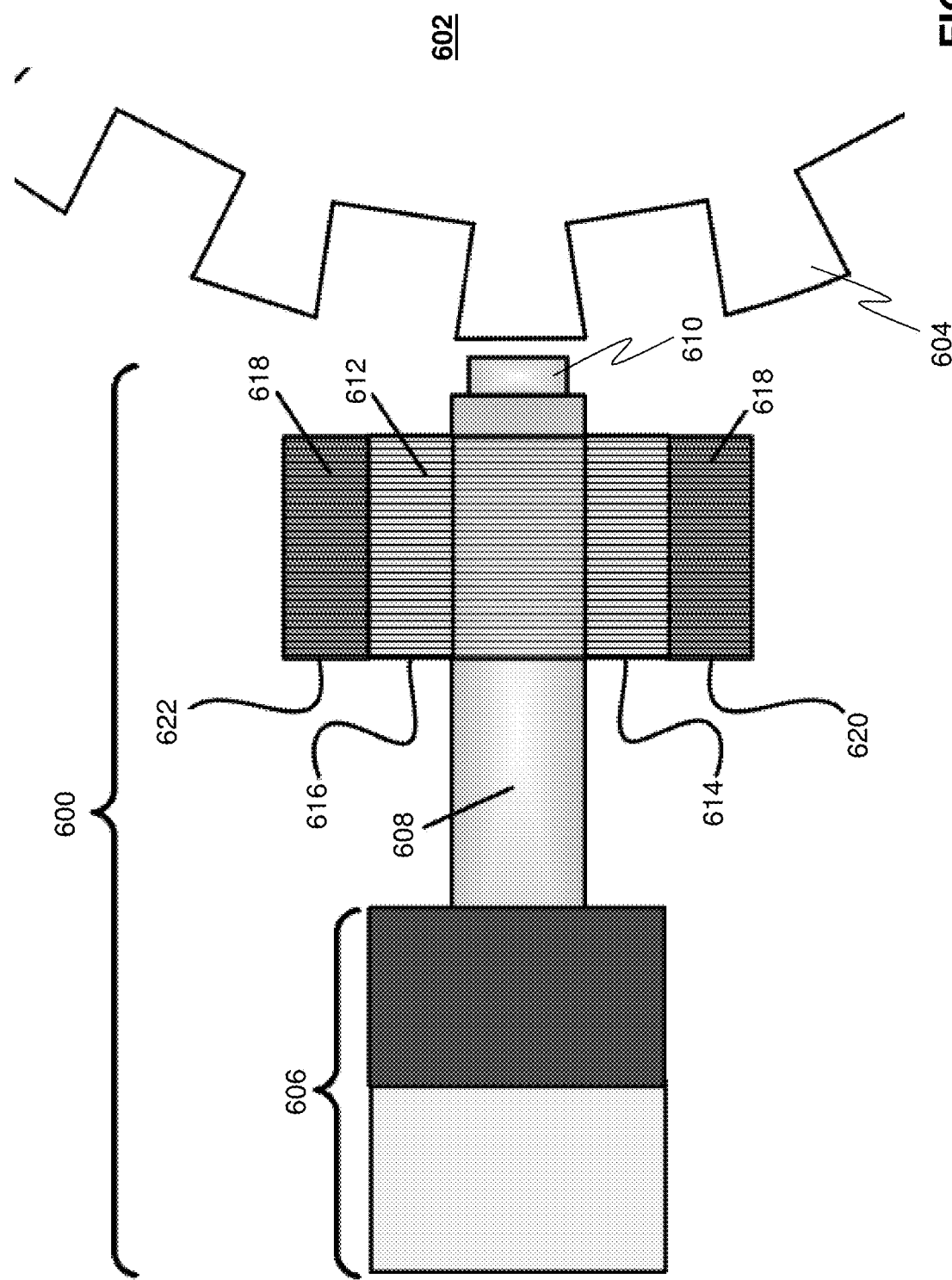
FIG. 5 shows schematic block diagram illustrating an energy harvester, in accordance with a fifth embodiment of the invention.

Referring to FIG. 5 still yet another embodiment of an energy harvester 600 is provided and is shown associated with a ferromagnetic flywheel 602 having gear teeth 604, wherein the energy harvester 600 includes a magnet 606, a pole piece 608 having a mechanical step 610, a first coil 612 having a first coil first AC output lead (FCAC1) 614 and a first coil second AC output lead (FCAC2) 616 and a second coil 618 having a second coil first AC output lead (SCAC1) 620 and a second coil second AC output lead (SCAC2) 622. It should be appreciated that the first coil 612 and the second coil 618 are configured in a 'stacked' configuration, wherein the first coil 612 is wrapped around the pole piece 608 and the second coil 618 is wrapped around the first coil 612. This advantageously allows the overall length of the energy harvester 600 to be shortened, as desired. For example, if the length of the energy harvester 600 is a design constraint, this configuration may be applied. If should be appreciated that if the thickness of the energy harvester 600 is a design constraint, the configuration of energy harvester 500 may be used.

It should be appreciated that the magnet 606 polarity orientation (north/south) is facing the pole piece 608 and is of arbitrary direction and this arbitrary polarity orientation may hold true for other embodiments containing magnets. It is contemplated that the magnet 606 may be constructed of a material that is appropriately chosen such that its magnetic performance is preserved at the elevated temperatures present in the area around an aircraft engine. Some examples of these appropriate high temperature magnetic materials may include, but are not limited to, variants of samarium cobalt (SmCo), such as SmCo series 1:5 and series 2:17.

Figure 6:
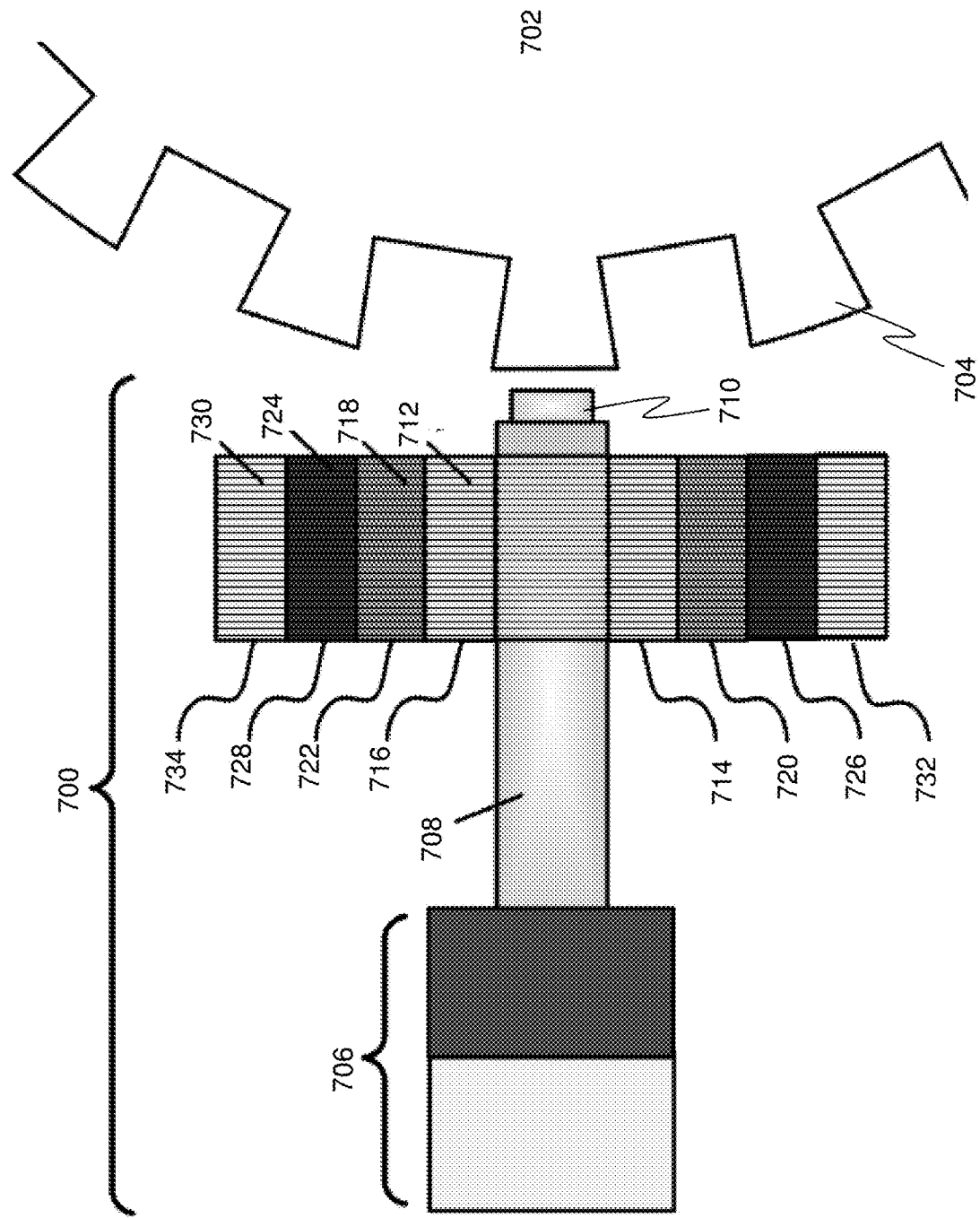
FIG. 6 shows schematic block diagram illustrating an energy harvester, in accordance with a sixth embodiment of the invention.

Referring to FIG. 6, it should be appreciated that still yet another embodiment of an energy harvester 700 is provided wherein the 'stacked' coil configuration shown in FIG. 5 is extended to include N coils. The energy harvester 700 is shown associated with a ferromagnetic flywheel 702 having gear teeth 704 and includes a magnet 706, a pole piece 708 having a mechanical step 710, a first coil 712 having a first coil first AC output lead (FCAC1) 714 and a first coil second AC output lead (FCAC2) 716, a second coil 718 having a second coil first AC output lead (SCAC1) 720 and a second coil second AC output lead (SCAC2) 722, a third coil 724 having a third coil first AC output lead (TCAC1) 726 and a third coil second AC output lead (TCAC2) 728 and an N coil 730 having an N coil first AC output lead (NCAC1) 732 and an N coil second AC output lead (NCAC2) 734. It should be appreciated that the first coil 712, second coil 718, third coil 724 to the N coil 730 are configured in a 'stacked' configuration, wherein the first coil 712 is wrapped around the pole piece 708, the second coil 718 is wrapped around the first coil 712, the third coil 724 is wrapped around the second coil 718 and the N coil is wrapped around the preceding coil (in this example, the third coil 724).

Figure 7:
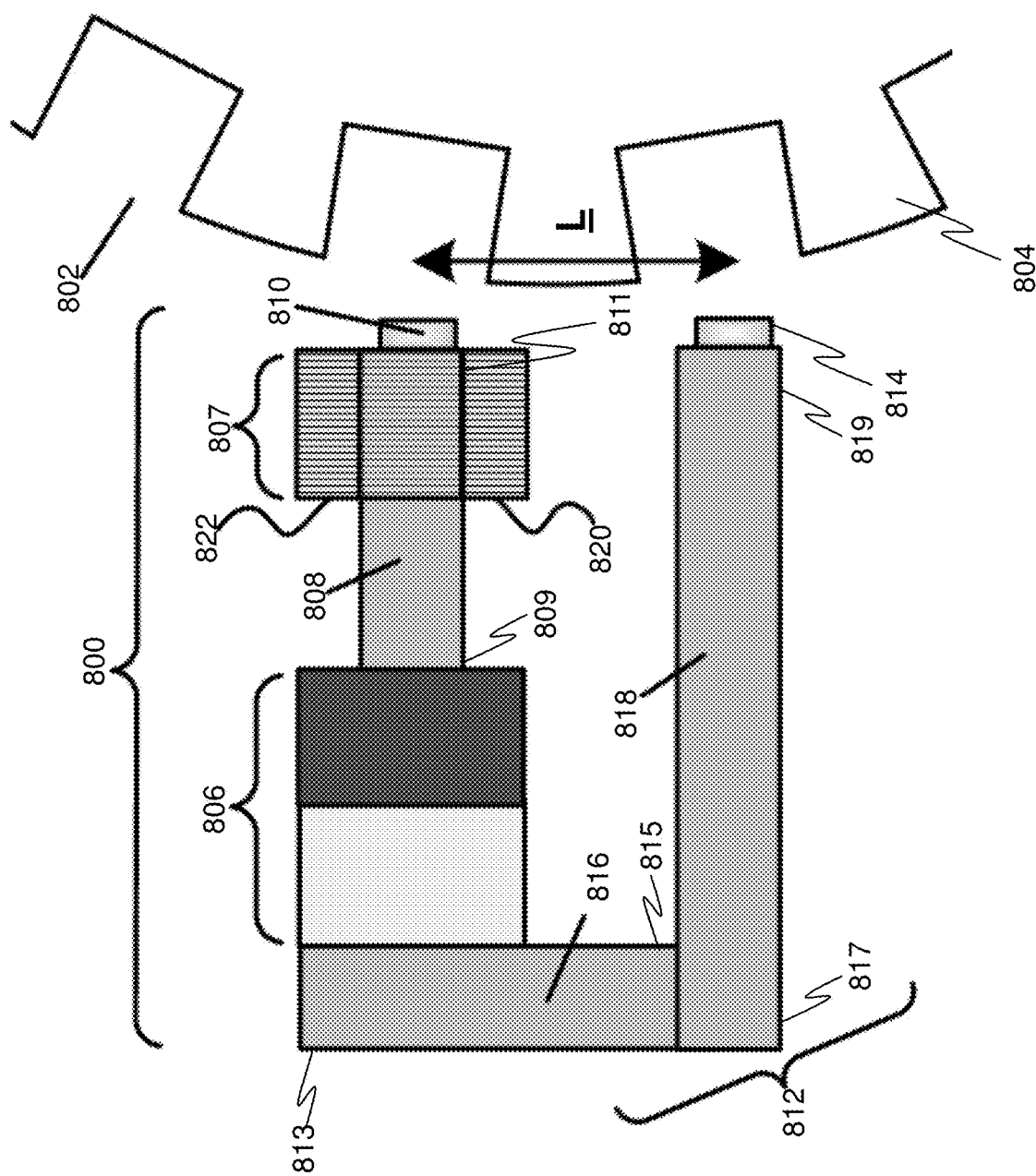
FIG. 7 shows schematic block diagram illustrating an energy harvester, in accordance with a seventh embodiment of the invention.

Referring to FIG. 7, still yet another embodiment of an energy harvester 800 is provided and illustrates an optimized configuration of all the proceeding embodiments of this invention. In some embodiments, efficient power delivery may require that the output impedance of the energy harvester 800 be minimized for a given size, which may be dictated by available volume in the area surrounding the ferromagnetic gear or other ferromagnetic structure or material that interfaces with the mechanical step of the pole piece. In the specific case of engine mounted components, a keep-in-zone and mounting location is typically specified in the vicinity of the rotational ferromagnetic gear (although other locations may be used) and one of the goals is to optimize the energy harvested power to device size ratio to maximize the power delivery efficiency. Referring again to FIG. 1, the output impedance of the traditional variable reluctance design may be, at least partially, dictated mainly by the number of coils (i.e. total length of the wire), wire material and wire gauge. Using a larger wire gauge, aimed at lowering the coil impedance, while simultaneously maintaining the same physical dimension of the coil will yield a smaller number of coils and therefore a smaller dØ/dt resulting in a smaller peak-to-peak voltage. To offset this smaller number of coils required to reduce the output impedance in the optimized configuration of FIG. 7, a second pole piece may be added to the single pole piece configuration of FIG. 1 which closes the magnetic circuit path back to the opposite magnet pole which results in a magnetic reluctance much lower than that of air. The second pole piece can either be machined in a 90° contiguous piece, or be comprised of two separate pole pieces and for lower manufacturing cost.

Accordingly, referring to FIG. 7, an energy harvester 800 is provided and shown associated with a ferromagnetic flywheel 802 having gear teeth 804, wherein the energy harvester 800 includes a magnet 806, a coil 807, a first pole piece 808 having a first pole piece first end 809, a first pole piece second end 811 and a first mechanical step 810 and a second pole piece 812 having a second mechanical step 814, wherein the second pole piece 812 includes a second pole piece first portion 816 and a second pole piece second portion 818. The second pole piece first portion 816 includes a second pole piece first portion first end 813 and a second pole piece first portion second end 815 and the second pole piece second portion 818 includes a second pole piece second portion first end 817 and a second pole piece second portion second end 819. In this embodiment, the second pole piece first portion 816 is configured to be proximate one end of the first pole piece 808 and substantially perpendicular (i.e. approximately 90°) relative to the first pole piece 808 and the second pole piece second portion 818 is arranged to be substantially parallel (i.e. approximately 0°) relative to the first pole piece 808. It should be appreciated that the second pole piece second portion 818 may be separated from the first pole piece 808 by a distance L, wherein the distance L may be chosen such that when the first mechanical step 810 is located proximate to and aligned with one of the gear teeth 804 of the ferromagnetic flywheel 802, the second mechanical step 814 is located proximate to and aligned with the preceding gear tooth 804 of the ferromagnetic flywheel 802. The coil 807 is configured to wrap around the first pole piece 808 and includes a first AC output lead (AC1) 820 and a second AC output lead (AC2) 822.

It should be appreciated that by concentrating the magnetic field from the mechanical steps 810, 814 (or the pole piece tip without the mechanical step) back to the opposite magnet pole, a much larger Δϕ is achieved and thereby a larger harvested voltage can be produced. This advantageously results in a configuration that allows the peak-to-peak voltage to be maintained, which may be required to meet minimum voltage levels in the ECU for speed measurement, while simultaneously maximizing power delivery for energy harvesting applications for a given device size. Finite element modeling of the abovementioned configuration corroborates this optimized device structure and shows a substantial increase in magnetic flux generation when compared to without the second pole piece while fixing all other design parameters. It should also be appreciated that the energy harvester 800 of FIG. 7 can be outfitted with multiple coils positioned back-to-back on the pole piece 808, 812 as shown in energy harvesters 400, 300 of FIG. 3 and FIG. 4, respectively, and/or stacked one on top of another as shown in energy harvesters 600 and 700 of FIG. 5 and FIG. 6.

Figure 8:
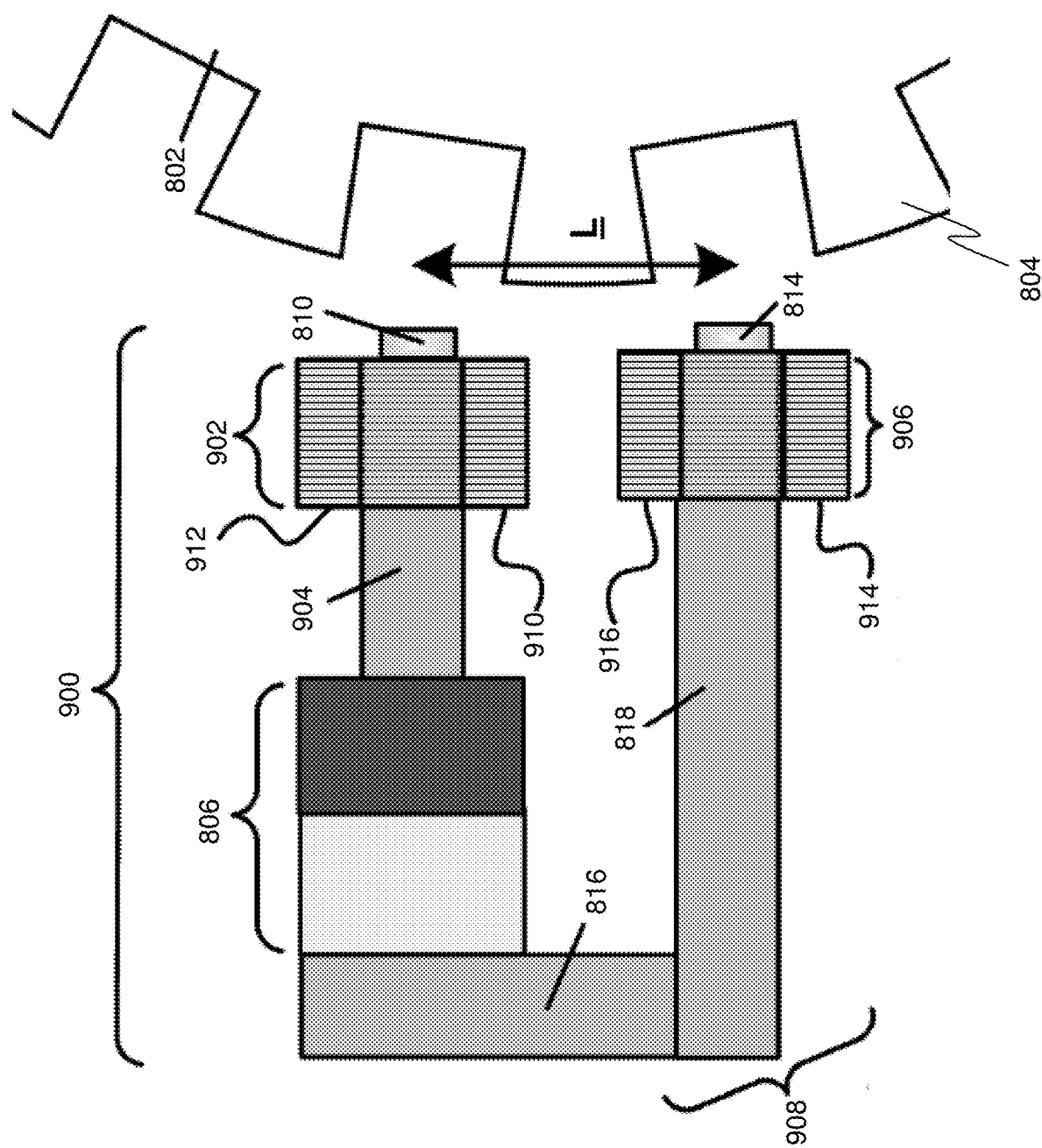
FIG. 8 shows schematic block diagram illustrating an energy harvester, in accordance with an eighth embodiment of the invention.

Referring to FIG. 8 still yet another embodiment of an energy harvester 900 is provided and is similar in design to the energy harvester 800 of FIG. 7 with the addition of a second coil 824 that is associated with the second pole piece 812. Accordingly, the energy harvester 900 includes a first coil 902 that is configured to wrap around a first pole piece 904 and a second coil 906 that is configured to wrap around a second pole piece 908. The first coil 902 includes a first coil first AC output lead (FCFAC1) 910 and a first coil second AC output lead (FCSAC2) 912 and the second coil 906 includes a second coil first AC output lead (SCFAC1) 914 and a second coil second AC output lead (SCSAC2) 916. It should be appreciated that this provides a first power channel having outputs FCFAC1 910 and FCSAC 912 and a second power channel having outputs SCFAC1 914 and SCSAC 916. Moreover, it is contemplated that in other embodiments, the energy harvester 800 of FIG. 7 and/or the energy harvester 900 of FIG. 8 may be configured to include N multiple coils positioned back-to-back on the first pole piece 808, 904 and/or second pole piece 812, 908 as shown in FIG. 7 and FIG. 8, and/or stacked one on top of each other similar to energy harvester 600 shown in FIG. 5 and/or energy harvester 700 shown in FIG. 6.

Figure 9:
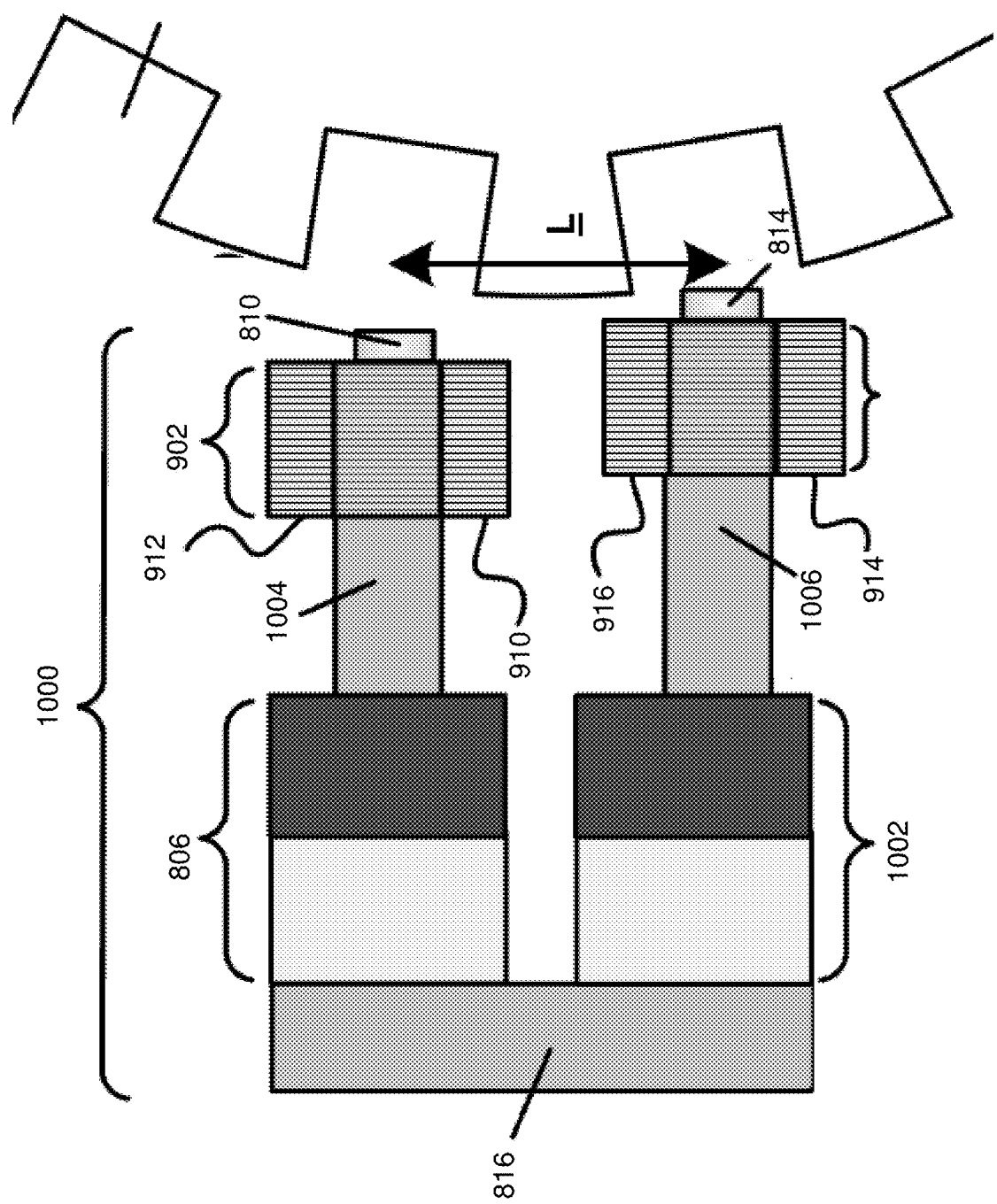
FIG. 9 shows schematic block diagram illustrating an energy harvester, in accordance with a ninth embodiment of the invention.

In still yet another embodiment and referring to FIG. 9, an energy harvester 1000 is shown and includes a second magnet 1002 positioned between a first pole piece 1004 and a second pole piece 1006. As with the other embodiments, the energy harvester 1000 of FIG. 9 may be configured to include N multiple coils positioned back-to-back on the first pole piece 808, 904 and/or second pole piece 812, 908 as shown in FIG. 7 and FIG. 8, and/or stacked one on top of each other similar to energy harvester 600 shown in FIG. 5 and/or energy harvester 700 shown in FIG. 6.

Figure 10:
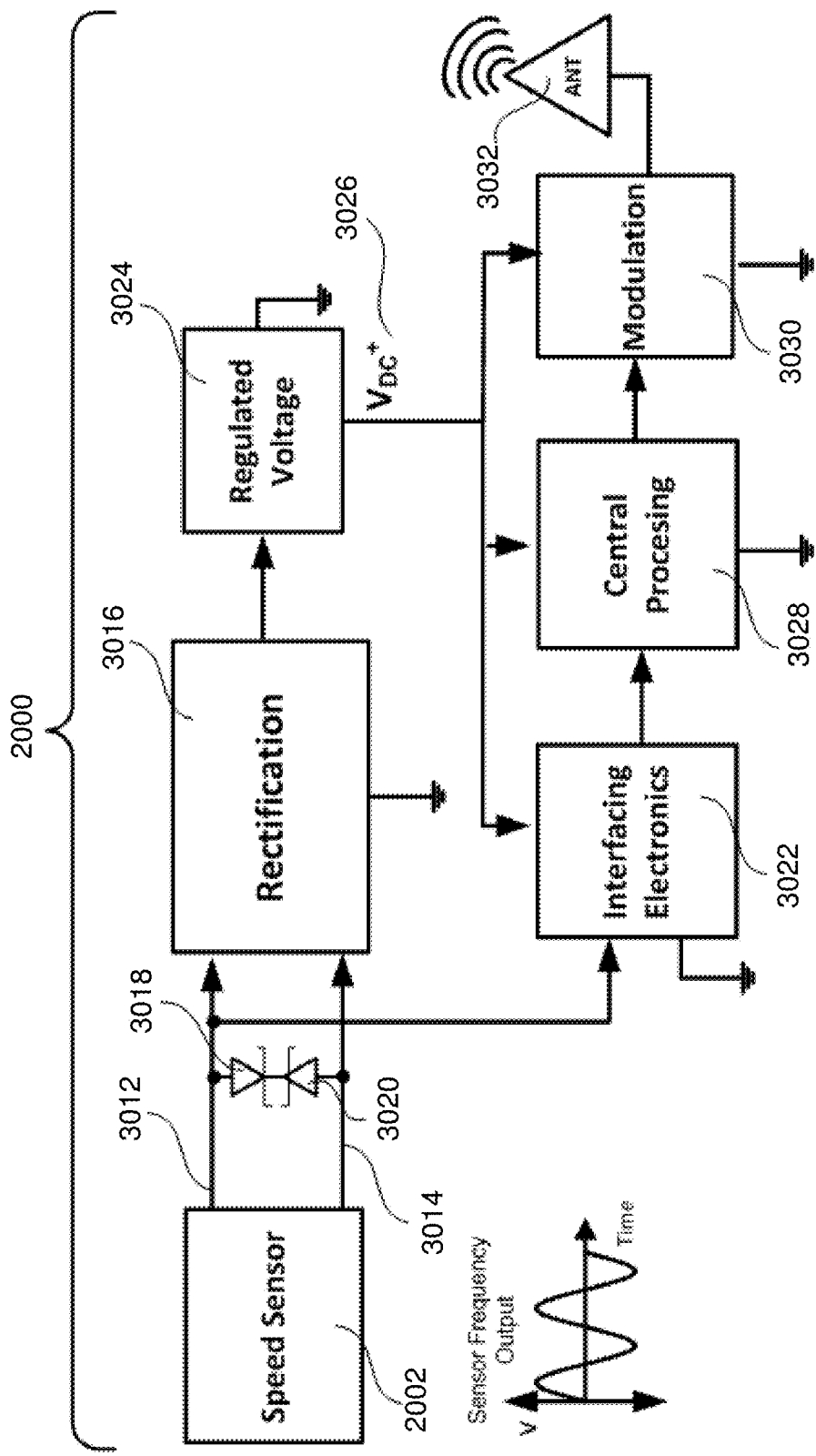
FIG. 10 shows a schematic block diagram illustrating a self-powered wireless speed sensor, in accordance with a first embodiment of the invention.

It should be appreciated that all of the embodiments that fall within the scope of this invention lend themselves operational as self-powered wireless speed sensors for aircraft (and/or non-aircraft) engine speed monitoring and/or monitoring of other rotational ferromagnetic devices onboard aircraft (and/or non-aircraft) as they produce time varying electrical signals in response to the moving target structure. Accordingly, in still yet another embodiment of this invention and referring to FIG. 10, a self-powered wireless speed sensor system 2000 is shown. It should be appreciated that the energy harvester 200, 300, 400, 500, 600, 700, 800, 900 may include the self-powered wireless speed sensor system 2000 which is configured to harvest the energy obtained from the ferromagnetic flywheel 202, 302, 402, 602, 702, 802 and/or other time-varying ferromagnetic device while simultaneously (and/or non-simultaneously) processing the rotational speed information of the ferromagnetic flywheel 202, 302, 402, 602, 702, 802. The self-powered wireless speed sensor system 2000 may also include wireless telemetry circuitry which creates a wireless link to a remote wireless receiver which then networks the sensor information and other relevant sensor identification data to the desired receiver. In one embodiment, the harvested energy is used to power the electrical circuits used to process the speed and/or time varying rotational information as well as the wireless telemetry circuitry, thereby rendering the entire system self-powered. In its simplest form, the self-powered wireless speed sensor system 2000 reflecting this self-powered wireless sensor scheme is shown in FIG. 10. With reference to the self-powered wireless speed sensor system 2000 shown in FIG. 10, the speed sensor or rotational sensor topology 2002 can be represented as any variable reluctance energy harvester suitable to the desired end purpose, including any embodiments disclosed herein or that fall within the scope of the invention.

Figure 11:
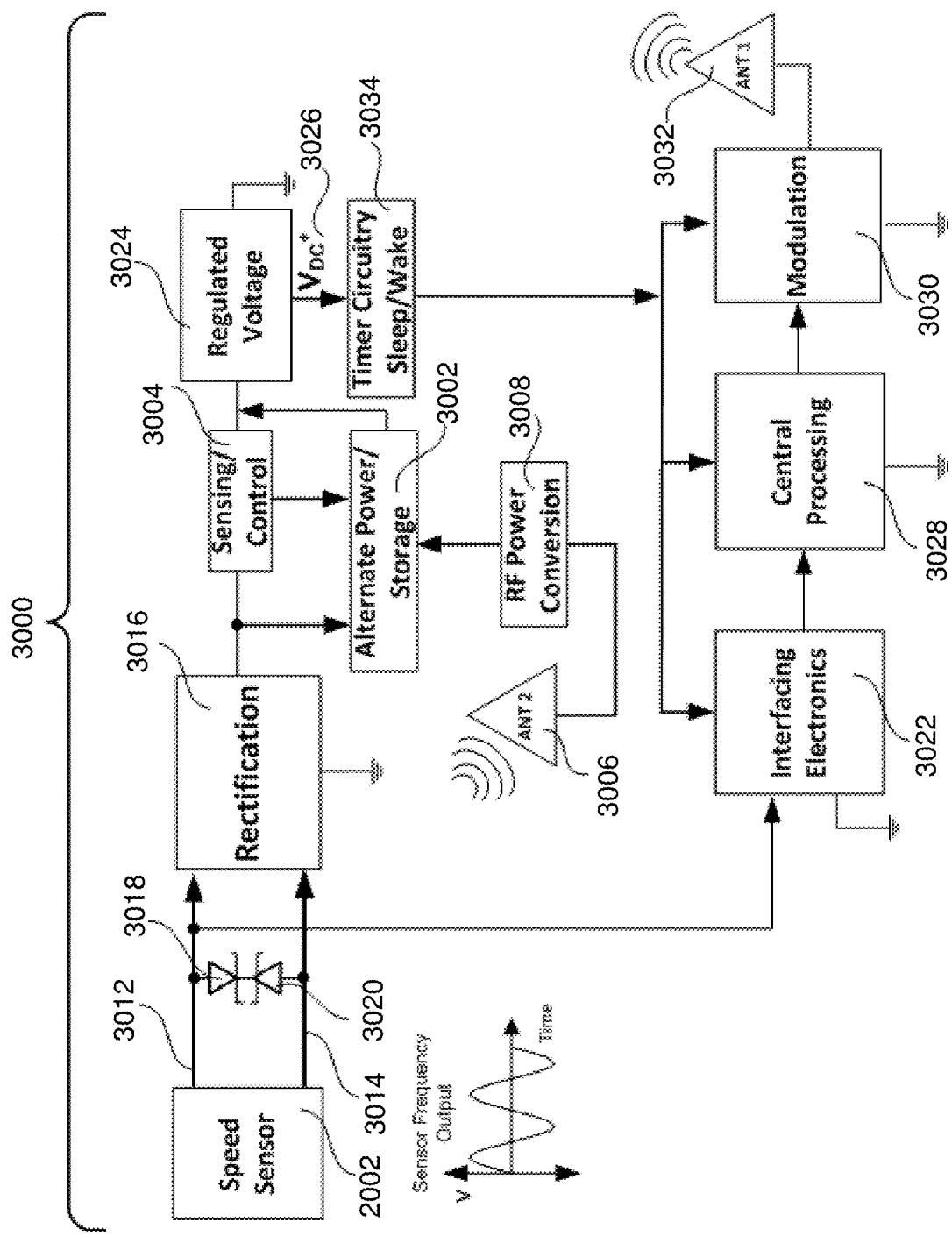
FIG. 11 shows a schematic block diagram illustrating a self-powered wireless speed sensor, in accordance with a second embodiment of the invention.

In yet another embodiment of the invention and referring to FIG. 11, a self-powered wireless speed sensor system 3000 is shown and may include an alternate energy source or energy storage unit 3002 and a sensing/control system 3004 which may be used for supplying power to the system when the ferromagnetic material is stationary or rotating at speeds insufficient to deliver adequate power to the electrical devices. This alternate power source 3002 may include a high temperature battery, super capacitor, re-chargeable battery or RF energy harvest topology. RF energy harvest topology consists of a receive antenna 3006 and associated RF power conversion circuitry 3008, where the output of the RF power conversion circuitry may be supplied as the alternate energy source or to charge a storage device. The RF energy harvest antenna 3010 may receive its electromagnetic radiation from a dedicated external RF interrogator.

It should be appreciated that the circuitry of FIG. 11 is configured to produce time varying voltage outputs 3012 and 3014 which are used for DC rectification of a sensor output signal 3016. Sensor output leads 3012 and 3014 may include back-to-back Zener diodes (3018 and 3020) and/or other passive network used to clamp the output voltage to a specified magnitude for over speed protection. This time varying signal also gets sent to interfacing electrical circuitry 3022, which may include zero-cross detection, voltage clamping and/or other electrical devices used to generate accurate speed pulse information. After rectification, the power may be regulated 3024 to the desired operating voltage level 3026 which may include but not be limited to linear and/or switching regular topologies and zener diode voltage references.

A central processing system 3028 may then be employed to process the sensor data, apply all the relevant networking information before applying the desired data modulation 3030 scheme and sent to the transmitting antenna 3032. RF modulation schemes and carrier frequencies are designed to operate within the electromagnetic spectrum and may be configured to abide by the wireless protocol with which the system presented in this invention is operating within. Central processing circuitry 3028 may include a microcontroller, microprocessor, programmable logic device and/or other analog and/or digital logic circuitry designed to perform the appropriate data handling of the sensor signal. Here, is it noted that passive devices such as smoothing and storage capacitors are implicit in DC power regulation and have been excluded from the figures described herein It should be appreciated that alternate sources of energy harvesting can be used here, including but not limited to thermal and vibration, the method used dependent upon the environment and application. Sensing and switching electrical circuitry 3002 may be employed here to select the appropriate means of energy source (nominal output or backup energy source) depending on the current state of the energy level from the rectification topology 3016. It should be appreciated here that the output of the rectification circuitry 3016 during normal operation can be used to charge the alternate energy storage unit 3002 whilst in normal operating conditions. Furthermore, a timer system 3034 can be utilized to achieve sleep/wake cycles of the sensor system for power saving and low power applications.

Figure 12:
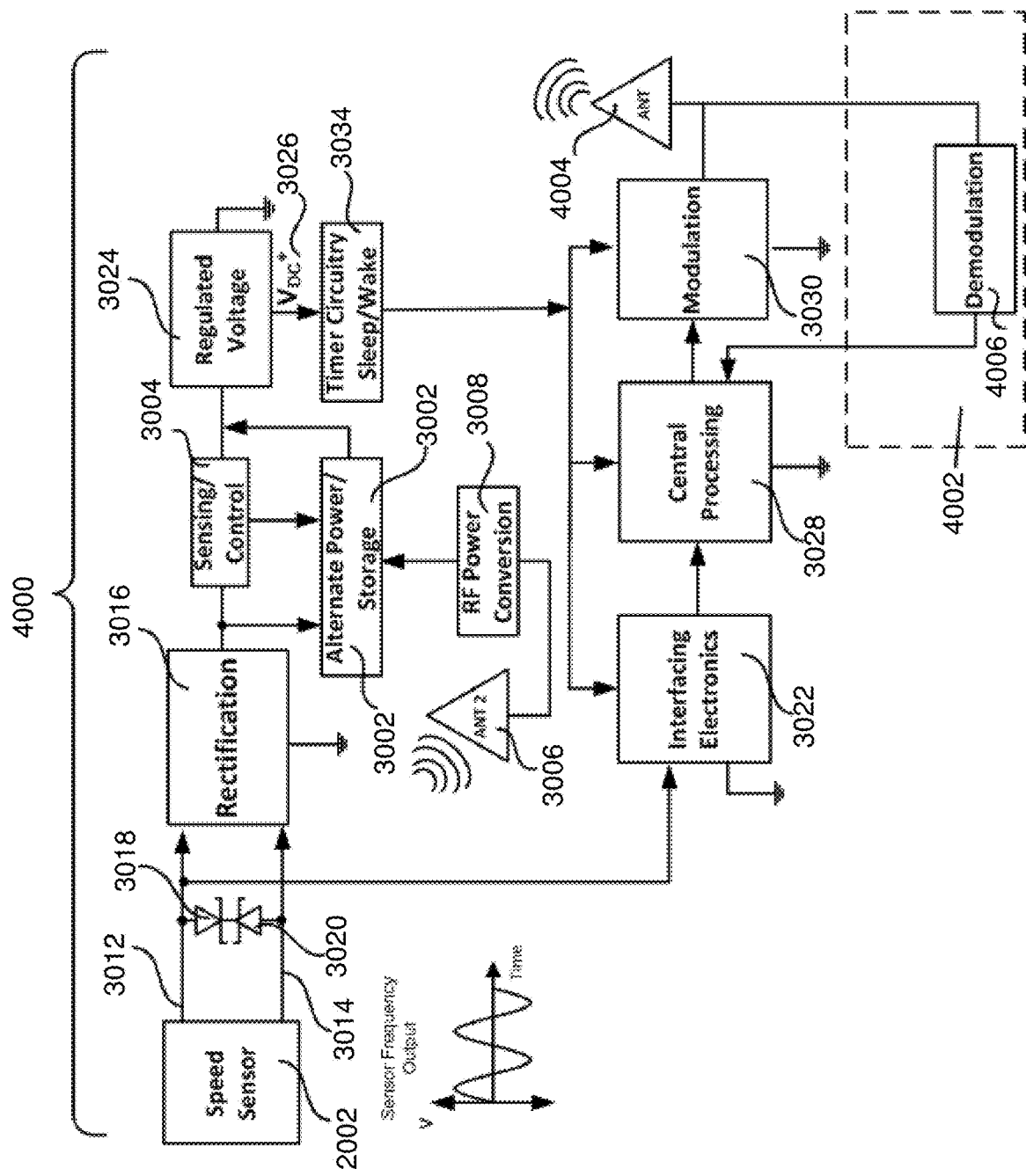
FIG. 12 shows a schematic block diagram illustrating a self-powered wireless speed sensor, in accordance with a third embodiment of the invention.

FIG. 12 displays still yet another embodiment of a self-powered wireless speed sensor system 4000 is shown, wherein the wireless speed sensor system 4000 may be integrated as a node within a bi-directional wireless networking topology such as a star network or multi-hop wireless mesh. The self-powered wireless speed sensor system 4000 may include a wireless receiver system 4002 used for receiving real-time feedback from the network, such those including but not limited to addresses allocation, acknowledgments/negative acknowledgments, congestion information, time/frequency channel allocation, synchronization from the master controller, etc. The receiver may include a receive antenna 4004 and demodulation circuitry 4006 used to process the demodulated network information and feedback relevant network information to the central processing system 3028.

In accordance with the present invention, the method and/or processing of the invention may be implemented, wholly or partially, by a controller operating in response to a machine-readable computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing.

Moreover, the method and/or processing of the present invention may be embodied in the form of a computer or controller implemented processes. The method and/or processing of the invention may also be embodied in the form of computer program code containing instructions embodied in tangible media, such as floppy diskettes, CD-ROMs, hard drives, Solid State Drives (SSD) and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

While the invention has been described with reference to an exemplary embodiment, it should be understood by those skilled in the art that various changes may be made and equivalents may be substituted for elements thereof without departing from the scope of the invention. Moreover, the embodiments or parts of the embodiments may be combined in whole or in part without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

I claim:

1. An energy harvester article configured to associate with a ferromagnetic flywheel having gear teeth, comprising:
   a first pole piece, wherein the first pole piece includes a first pole piece first end and a first pole piece second end;
   a second pole piece, wherein the second pole piece includes a second pole piece first portion and a second pole piece second portion, and wherein the second pole piece first portion includes a second pole piece first portion first end and a second pole piece first portion second end, and wherein the second pole piece second portion includes a second pole piece second portion first end and a second pole piece second portion second end, and wherein the second pole piece first portion is configure to be substantially perpendicular to the first pole piece and the second pole piece first portion first end is located proximate the first pole piece first end, and wherein the second pole piece second portion is configure to be substantially parallel to the first pole piece and the second pole piece second portion first end is located proximate the second pole piece first portion second end, and wherein the first pole piece and second pole piece second portion are separated by a first predetermined distance;
   a magnet, wherein the magnet is associated with the first pole piece to surround at least a portion of the first pole piece and to be separated from the second pole piece second portion by a second predetermined distance; and
   a coil, wherein the coil is configured to be wrapped around the first pole piece proximate the first pole piece second end.

2. The energy harvester article of claim 1, wherein the first pole piece second end is located proximate the ferromagnetic flywheel.

3. The energy harvester article of claim 1, wherein the second pole piece second portion second end is located proximate the ferromagnetic flywheel.

4. The energy harvester article of claim 1, wherein at least one of the first pole piece second end and the second pole piece second portion second end includes a mechanical step.

5. The energy harvester article of claim 1, wherein the first predetermined distance is determined such that when the first pole piece second end is substantially aligned with one of the gear teeth, the second pole piece second portion second end is substantially aligned with the preceding gear tooth.

6. The energy harvester article of claim 1, wherein the first pole piece and second pole piece are at least partially constructed from a ferromagnetic material.

7. The energy harvester article of claim 1, further comprising a second coil, wherein the second coil is configured to be wrapped around the second pole piece second portion proximate the second pole piece second portion second end.

8. The energy harvester article of claim 1, wherein the magnet is associated with the first pole piece to be proximate the first pole piece first end.

9. The energy harvester article of claim 1, wherein the coil includes a first AC output lead and a second AC output lead.

10. An energy harvester article configured to associate with a ferromagnetic flywheel having gear teeth, comprising:
    a first pole piece, wherein the first pole piece includes a first pole piece first end and a first pole piece second end;
    a second pole piece, wherein the second pole piece includes a first portion and a second portion configured into an "L" shape, and wherein the second portion is arranged to be substantially parallel with the first pole piece and separated from the first pole piece by a distance L;
    a magnet, wherein the magnet is associated with the first pole piece to be separated from the second pole piece second portion by a second predetermined distance; and
    a coil, wherein the coil is configured to be wrapped around the first pole piece proximate the first pole piece second end.

11. The energy harvester article of claim 10, wherein the first pole piece second end is located proximate the ferromagnetic flywheel.

12. The energy harvester article of claim 10, wherein the second pole piece includes a first portion first end, a first portion second end, a second portion first end and a second portion second end.

13. The energy harvester article of claim 10, wherein the second portion second end is located proximate the ferromagnetic flywheel.

14. The energy harvester article of claim 12, wherein at least one of the first pole piece second end and the second portion second end includes a mechanical step.

15. The energy harvester article of claim 10, wherein the distance L is determined such that when the first pole piece second end is substantially aligned with one of the gear teeth, the second portion second end is substantially aligned with the preceding gear tooth.

16. The energy harvester article of claim 10, wherein the first pole piece and second pole piece are at least partially constructed from a ferromagnetic material.

17. The energy harvester article of claim 10, further comprising a second coil, wherein the second coil is configured to be wrapped around the second portion proximate the second portion second end.

18. The energy harvester article of claim 12, wherein the magnet is associated with the first pole piece to be proximate the first pole piece first end and the first portion first end.

19. The energy harvester article of claim 10, wherein the coil includes a first AC output lead and a second AC output lead.

20. The energy harvester article of claim 17, wherein the second coil includes a first AC output lead and a second AC output lead.

\* \* \* \* \*